United States Patent [19]

Yokoyama

[11] Patent Number: 5,027,228

[45] Date of Patent: Jun. 25, 1991

[54] ANALOG TYPE MAGNETIC RECORDING AND REPRODUCING DEVICE WITH DIGITAL INPUT/OUTPUT COUPLING

[75] Inventor: Kenji Yokoyama, Hamamatsu, Japan

[73] Assignee: Yamaha Corporation, Hamamatsu, Japan

[21] Appl. No.: 385,000

[22] Filed: Jul. 25, 1989

[30] Foreign Application Priority Data

Jul. 26, 1988 [JP] Japan .............................. 63-98863[U]

[51] Int. Cl.⁵ .......................... G11B 5/86; G11B 3/64
[52] U.S. Cl. ........................................ 360/15; 369/85
[58] Field of Search ............... 360/15, 32, 51; 369/84, 369/85

[56] References Cited

U.S. PATENT DOCUMENTS

| | | | |
|---|---|---|---|
| 4,355,338 | 10/1982 | Yamamoto et al. | 360/15 |
| 4,410,917 | 10/1983 | Newdoll et al. | 360/32 |
| 4,476,502 | 10/1984 | Watanabe et al. | 360/65 |
| 4,536,804 | 8/1985 | Kasubuchi et al. | 360/32 |
| 4,713,802 | 12/1987 | Kobata et al. | 360/51 |
| 4,719,521 | 1/1988 | Juso | 360/32 |
| 4,841,503 | 6/1989 | Yamada et al. | 360/15 |

*Primary Examiner*—Vincent P. Canney
*Attorney, Agent, or Firm*—Spensley Horn Jubas & Lubitz

[57] ABSTRACT

An analog type magnetic recording and reproducing device such as a tape recorder includes a digital input terminal to which a digital signal is applied, a digital-to-analog converter for converting the digital signal applied to the digital input terminal to an analog signal, an analog magnetic recording and reproducing unit for recording and reproducing an output analog signal of the digital-to-analog converter, an analog-to-digital converter for converting a reproduced analog signal of the analog magnetic recording and reproducing unit to a digital signal; and a digital output terminal from which an output digital signal of the analog-to-digital converter is delivered out. This device is capable of transmitting a signal in digital between an audio source apparatus and this device and between this device and an audio amplifier.

6 Claims, 4 Drawing Sheets

ANALOG TYPE MAGNETIC RECORDING AND REPRODUCING DEVICE WITH DIGITAL INPUT/OUTPUT COUPLING

BACKGROUND OF THE INVENTION

This invention relates to a magnetic recording and reproducing device and, more particularly, to an analog type magnetic recording and reproducing device having digital input and output terminals.

A conventional analog tape recorder such as an analog cassette tape recorder is constructed as shown in FIG. 2. In this analog tape recorder, a switch 14 is connected to a recording side during a recording mode and an analog source signal delivered out of a source apparatus is applied to an analog input terminal 10 via a cable. The source signal is then amplified by a recording amplifier 12 and supplied to a head 16 through the switch 14 for being recorded on a tape 18. During a reproduction mode, the switch 14 is connected to a reproduction side and a reproduced signal is supplied to an analog output terminal 22 after being amplified by a reproduction amplifier 20 and then supplied to an analog tape input terminal of an amplifier (not shown) via a cable.

There have recently been developed various digital audio source apparatuses such as a CD (Compact Disc) player and a DAT (digital audio tape recorder). Some of these digital source apparatuses have, in addition to an analog output terminal from which a reproduced output is delivered out after being subjected to digital-to-analog conversion, a digital output terminal from which a reproduced signal is delivered out directly without being subjected to digital-to-analog conversion.

Since the conventional analog tape recorder has only an analog input terminal as shown in FIG. 2, such digital output from a digital source apparatus cannot be utilized effectively if it is desired to record the digital output by the conventional analog tape recorder. Recording of a reproduced signal from the digital source apparatus has to be made by using an analog output with resulting deterioration in an output signal in an input cable connecting the digital source apparatus and the analog tape recorder directly or through an audio amplifier for transmission of the signal in analog.

There have recently been developed audio amplifiers which have a digital input terminal. Since, however, the conventional analog tape recorder has only an analog output terminal, an analog input terminal only of such audio amplifier can be used with resulting deterioration in the signal in an output cable connecting the analog tape recorder and the audio amplifier for transmission of the signal in analog.

It is, therefore, an object of the invention to provide a magnetic recording and reproducing device capable of transmitting a signal in digital between a source apparatus and the magnetic recording and reproducing device and between the magnetic recording and reproducing device and an audio amplifier thereby to prevent deterioration in the signal occurring in input and output cables.

SUMMARY OF THE INVENTION

The magnetic recording and reproducing device achieving the above described object of the invention comprises a digital input terminal to which a digital signal is applied, digital-to-analog conversion means for converting the digital signal applied to this digital input terminal to an analog signal, analog magnetic recording and reproducing means for recording and reproducing an output analog signal of this digital-to-analog conversion means, analog-to-digital conversion means for converting a reproduced analog signal of this analog magnetic recording and reproducing means to a digital signal, and a digital output terminal from which an output digital signal of this analog-to-digital conversion means is delivered out.

According to the invention, a digital signal applied from the digital input terminal is recorded by the analog magnetic recording and reproducing means after being converted to an analog signal by the digital-to-analog conversion means. An analog signal reproduced from the analog magnetic recording and reproducing means is provided from the digital output terminal after being converted to a digital signal by the analog-to-digital conversion means.

Since a source signal is applied to the magnetic recording and reproducing device as a digital signal and provided from the magnetic recording and reproducing device as a digital signal, deterioration in the signal in input and output cables can be prevented. Further, since recording of a signal on a recording medium is made in an ordinary analog recording method, a recorded medium can be played back by a conventional analog type magnetic recording and reproducing device, thus affording interchangeability to the device. The device according to the invention is applicable also to a case where the source apparatus has no analog output terminal.

An embodiment of the invention will now be described with reference to the accompanying drawings.

BRIEF DESCRIPTION OF THE DRAWINGS

In the accompanying drawings.

DESCRIPTION OF A PREFERRED EMBODIMENT

Figure 1:
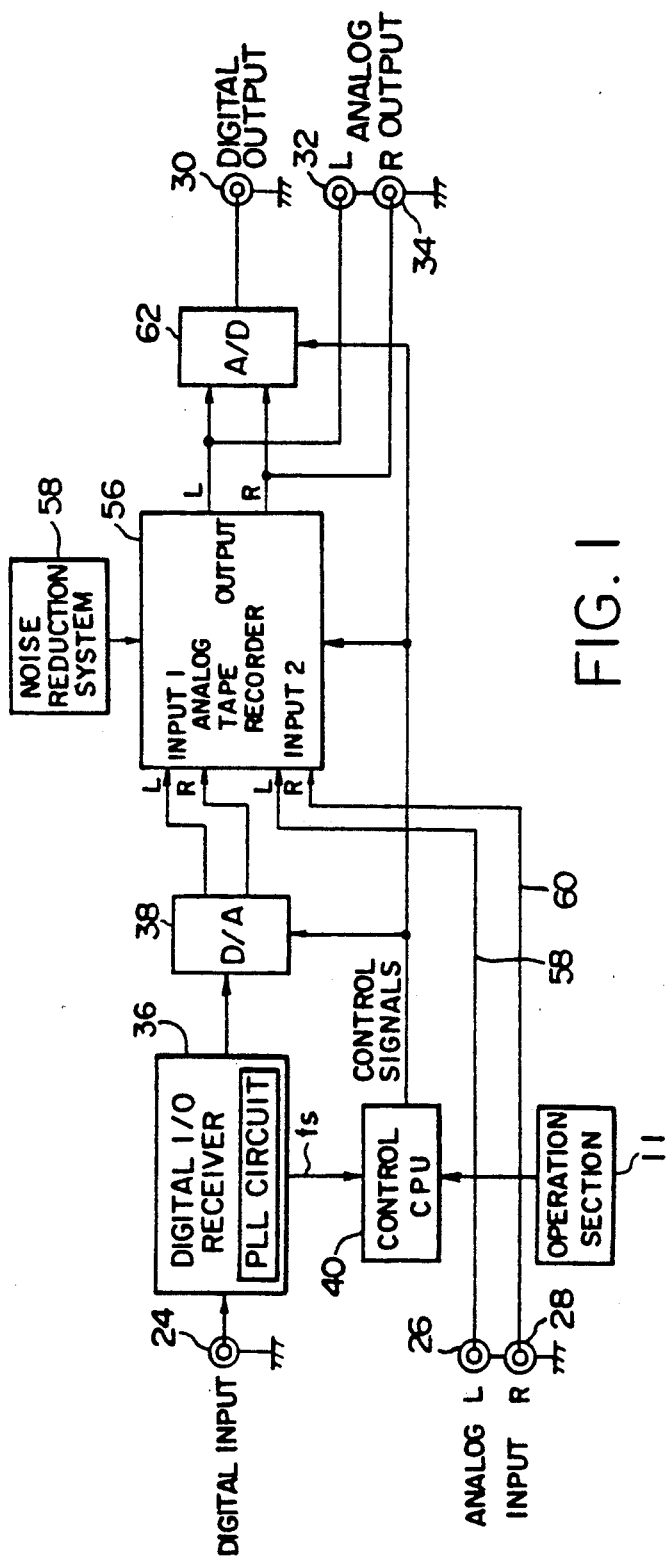
FIG. 1 is a block diagram showing an embodiment of the magnetic recording and reproducing device according to the invention.
Figure 2:
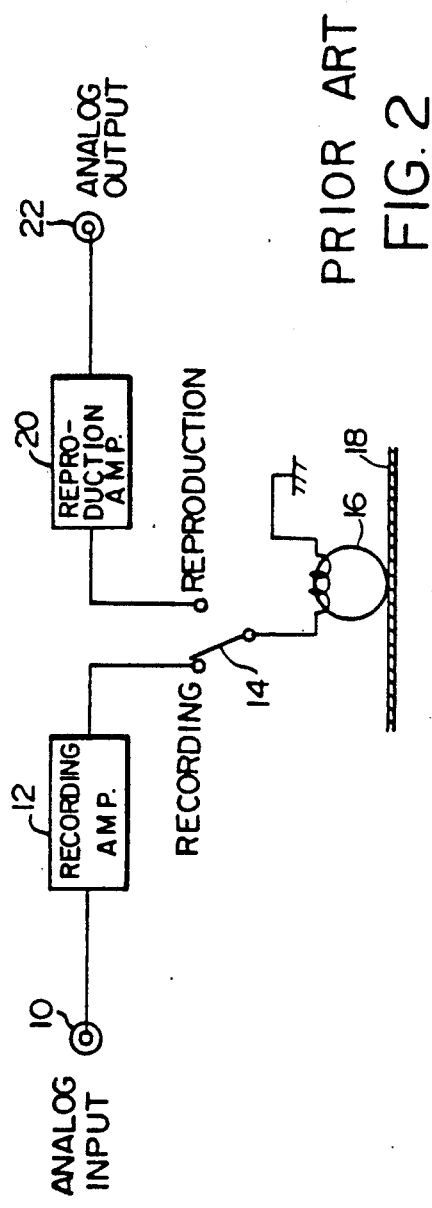
FIG. 2 is a block diagram showing a prior art magnetic recording and reproducing device.

An embodiment of the invention is shown in FIG. 1. In this tape recorder, various operations in an operation section 11 are informed to a CPU 40 and various operation modes are established by the control by the CPU 40.

This tape recorder has a digital input terminal 24 and analog input terminals 26 and 28 on the input side and a digital output terminal 30 and analog output terminals 32 and 34 on the output side.

To the digital input terminal 24 are connected digital output terminals of digital audio apparatuses such as a CD player, a DAT and a preamplifier through cables and digital signals whose left and right channels are multiplexed together are supplied from these apparatuses. The input digital signals are applied to a digital I/O receiver 36.

The digital I/O receiver 36 is a circuit for interfacing the input digital signals with a circuit of a posterior stage. This digital I/O receiver 36 has a PLL circuit therein and is thereby brought into automatic synchronization with a sampling frequency of an input digital signal (e.g., 44.1 kHz in the case of a CD player and 48 kHz in the case of a DAT) to perform detection of presence or absence of an input digital signal, detection of an error (i.e., parity check) and generation of subcodes etc. Data of the sampling frequency fs of the input digital signal is supplied from the digital I/O receiver to the CPU 40.

In the digital I/O receiver 36, the input digital signal synchronized with an internal clock (i.e., reference clock of the tape recorder of FIG. 1) is divided into left and right channel signals by a digital-to-analog converter 38 and converted to analog signals.

Figure 3:
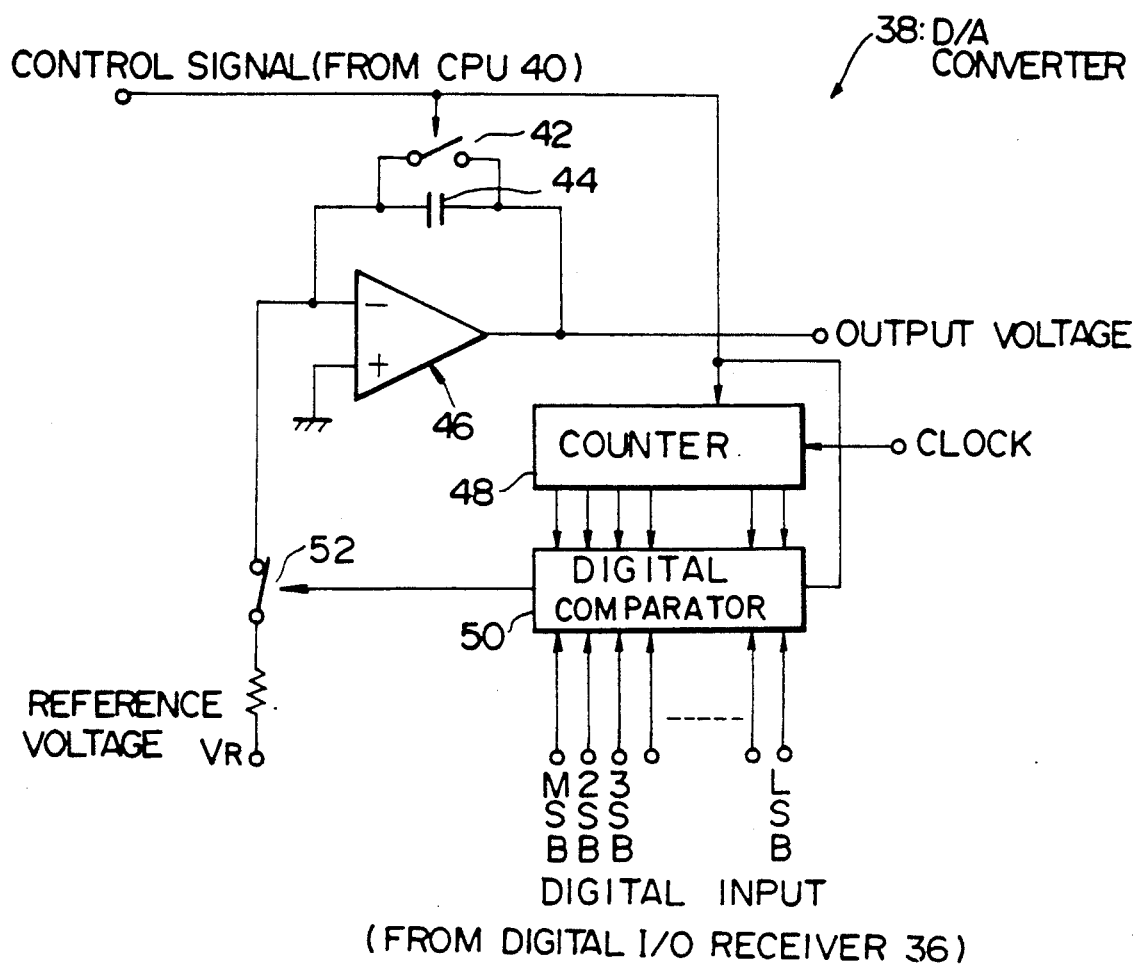
FIG. 3 is a block diagram showing a specific example of a digital-to-analog converter 38 of FIG. 1.

A specific example of the digital-to-analog converter 38 is shown in FIG. 3 which shows one channel only. This converter 38 is of an integrating circuit type, i.e., the clock is counted by a number designated by an input digital signal and a constant current is integrated during the counting period to provide an output voltage corresponding to the input digital signal. An analog switch 42 is turned on instantaneously during each period of the sampling pulse having frequency fs by a control signal applied from the CPU 40 thereby causing an integrating capacitor 44 to discharge. When the analog switch 42 is off, a counter 48 counts up the clock. The two inputs of a digital comparator 50 do not coincide with each other initially so that the analog switch 52 is in an on state thereby causing an integrator 46 to perform integration. In this state, the digital comparator 50 compares the output of the counter 48 with the digital input from the digital I/O receiver 36 and, when the output of the counter 48 has become larger, the analog switch 52 is immediately turned off and integration by the integrator 46 is stopped. Time length from start of integration till the moment when the output of the counter 48 has become larger is proportional to the value of the digital input signal and, accordingly, the integrated value at the time when the analog switch 52 has been turned off constitutes analog voltage corresponding to the digital input and this analog voltage is provided as the digital-to-analog conversion output.

Figure 4:
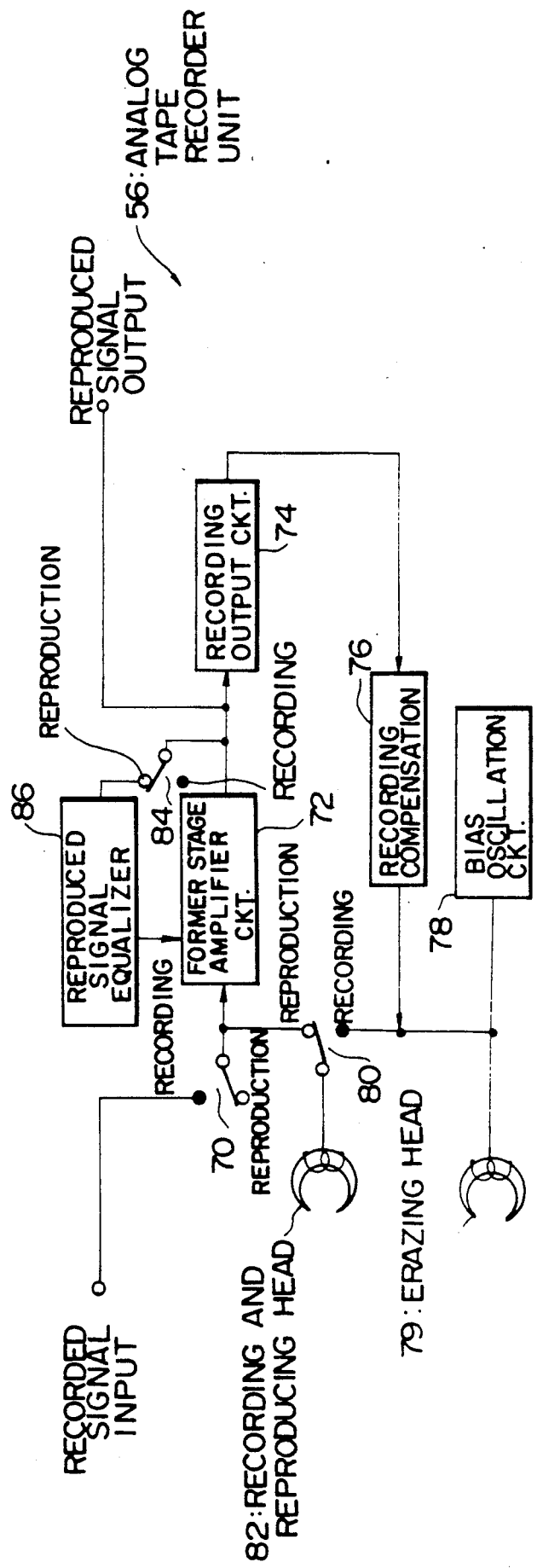
FIG. 4 is a block diagram showing a specific example of an analog tape recorder section 56 of FIG. 1.

In FIG. 1, the left and right channel signals produced by the digital-to-analog converter 38 are applied to an analog tape recorder section 56. The analog tape recorder section 56 includes a mechanical portion functioning as an analog tape recorder such as a compact cassette tape recorder, a head and an electrical circuit. An example of the electrical circuit of the analog tape recorder section 56 is shown in FIG. 4 which shows only one channel. During recording, a bias signal produced by a bias oscillation circuit 78 is supplied to an erazing head 79 to eraze previously recorded signals. Simultaneously, an input signal is supplied through a switch 70, a former stage amplifier circuit 72, a recording output circuit 74 and a recording compensation circuit 76 and is superposed on a bias signal from the bias oscillation circuit 78. The superposed signal is then supplied to a recording and reproducing head 82 through a switch 80 and recorded on the tape. During reproduction, a signal reproduced from the recording and reproducing head 82 is delivered out of the former stage amplifier circuit 72 through the switch 80, the former amplifier circuit 72, a switch 84 and a reproduced signal equalizer circuit 86.

To the analog tape recorder section 56 is added, as shown in FIG. 1, a noise reduction system 58 of a compressor-expander type for expanding the signal-to-noise ratio and dynamic range during recording and reproduction.

The analog reproduced signals of the left and right channels delivered out of the analog tape recorder section 56 are supplied directly to the analog output terminals 32 and 34. These analog reproduced signals are also supplied to an analog-to-digital converter 62 and analog-to-digital converted signals of the left and right channels are multiplexed together and supplied to the digital output terminal 30.

Figure 5:
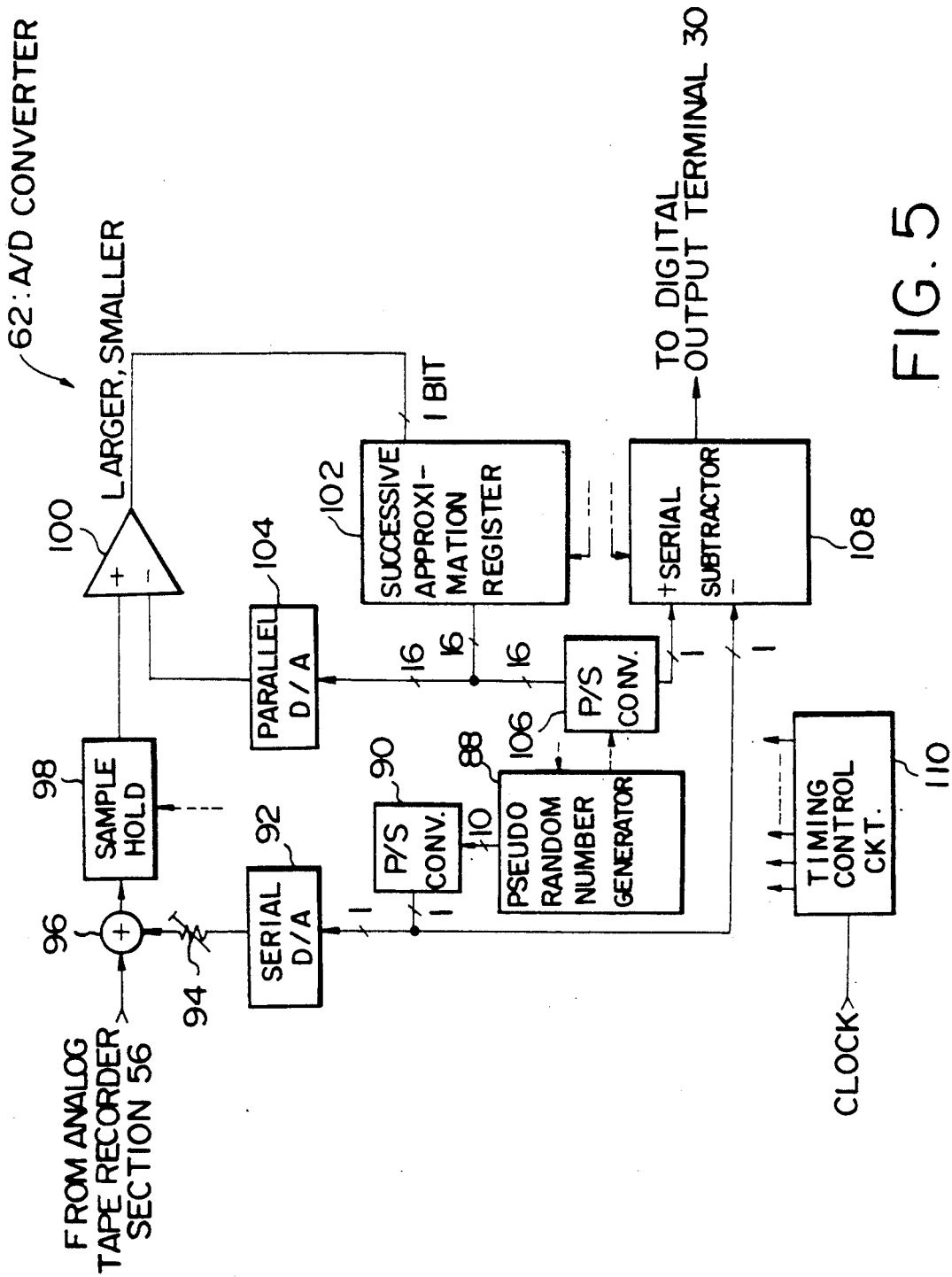
FIG. 5 is a block diagram showing a specific example of an analog-to-digital converter 62 of FIG. 1.

An example of the analog-to-digital converter 62 is shown in FIG. 5 which shows only one channel. This analog-to-digital converter is of a successive approximation type. In FIG. 5, a pseudo random-number generator 88 generates noise for dither in digital. This noise is supplied to a serial digital-to-analog converter 92 through a parallel-to-serial converter 90 and converted to an analog signal. The converted analog signal is then supplied to an adder 96 through an attenuator 94 and added to an output signal of the analog tape recorder section 56. The sum signal is applied to a comparator 100 through a sample hold circuit 98 with a sampling frequency of e.g., 44.1 kHz or 48 kHz. The output of a successive approximation register 102 is applied to the comparator 100 through a parallel digital-to-analog converter 104.

The comparator 100 sequentially compares the two inputs with each other and produces "1" on its bits when the output of the sample and hold circuit 98 is larger whereas it produces "0" on its bits when the output of the sample and hold circuit 98 is smaller. The comparator 100 performs this operation to the least significant bit. Thus, the successive approximation register 102 holds digital data corresponding to the output of the sample and hold circuit 98.

The data held in the successive approximation register 102 is applied to a serial subtractor 108 through a parallel-to-serial converter 106. Data from which noise has been subtracted is provided by the serial subtractor 108. By performing this operation each time a signal is held by the sample and hold circuit 98, a digital signal corresponding to the output analog signal of the analog tape recorder section 56 (for one channel) is provided.

A timing control circuit 110 is provided for controlling timings at respective portions of this circuit.

In a case where a digital output of a CD player is to be recorded, a digital output terminal of the CD player is connected to the digital input terminal 24 in FIG. 1 through a cable. A digital signal from the digital input terminal 24 is supplied to the digital-to-analog converter 38 through the digital I/O receiver 36 and the digital-to-analog converted signal is recorded in the analog tape recorder section 56. Since the signal is transmitted from the CD player to the digital input terminal 24 in digital, deterioration in the signal in the transmission cable can be prevented.

In a case where a tape reproduction output signal is provided in digital, the output signal from the analog tape recorder section 56 is converted to a digital signal by the analog-to-digital converter 62 and supplied to the digital output terminal 30. By applying this digital output to a digital input of a DAT, a preamplifier or the like through a cable, deterioration of the signal in the transmission cable can be prevented.

In the embodiment of FIG. 1, an analog signal can also be applied and delivered out by means of the analog input terminals 26 and 28 and the analog output terminals 32 and 34.

If a high efficiency noise reduction system is added to the analog tape recorder section 56 as shown in FIG. 1, recording and reproduction made in analog will not be inferior in respect of signal-to-noise ratio and dynamic range to recording and reproduction made by a 16-bit digital recording and reproducing device so that such analog recording and reproduction can be carried out without any practical inconvenience.

What is claimed is:

1. A magnetic recording and reproducing device, comprising:
   a digital input terminal to which a digital audio signal is applied;
   digital-to-analog conversion means for converting the digital audio signal applied to said digital input terminal to an analog audio signal;
   analog magnetic recording and reproducing means for recording and reproducing an output analog audio signal of the digital-to-analog conversion means;
   analog-to-digital conversion means for converting a reproduced analog audio signal of said analog magnetic recording and reproducing means to a digital audio signal; and
   a digital output terminal from which an output digital audio signal of said analog-to-digital conversion means is delivered out;
   whereby audio signals are transmitted to and from the magnetic recording and reproducing device in digital form such that signal deterioration associated with the transmission of audio signals in analog form is avoided, and maximum fidelity is achieved.

2. A device as defined in claim 1 which further comprises an analog input terminal receiving an analog audio signal and supplying the input analog audio signal to said analog magnetic recording and reproducing means.

3. A device as defined in claim 1 which further comprises an analog output terminal for delivering out the reproduced analog audio signal of said analog magnetic recording and reproducing means.

4. A device as defined in claim 1 which further comprises an analog input terminal receiving an analog audio signal and supplying the input analog audio signal to said analog magnetic recording and reproducing means and an analog output terminal for delivering out the reproduced analog audio signal of said analog magnetic recording and reproducing means.

5. A device as defined in claim 1 which further comprises an I/O receiver having a PLL circuit therein and being brought in synchronization with a sampling frequency of an input digital signal, data of the sampling frequency detected being used for controlling the operation of the digital-to-analog conversion means.

6. A device as defined in claim 1 wherein said analog magnetic recording and reproducing means comprises a noise reduction device for improving signal-to-noise ratio.

* * * * *